Figure 2:
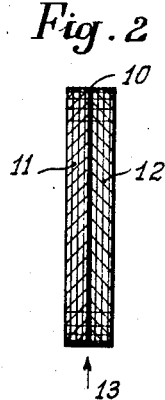

June 9, 1959   H. G. ANDRÉ   2,890,261
SEPARATOR FOR ELECTRIC BATTERIES
Filed July 12, 1955

INVENTOR:
HENRI G. ANDRÉ
BY
AGENT

United States Patent Office 2,890,261
Patented June 9, 1959

2,890,261

SEPARATOR FOR ELECTRIC BATTERIES

Henri Georges André, Montmorency, France, assignor to Yardney International Corp., New York, N.Y., a corporation of New York Application July 12, 1955, Serial No. 521,575

Claims priority, application France July 13, 1954

4 Claims. (Cl. 136—9)

My invention relates to a separator for electric batteries and particularly storage batteries.

It is an object of the invention to provide a separator adapted to be interposed between the opposite-polarity active substances of a battery to ensure a satisfactory progress of the electro-chemical reactions therein, of such character as to retain its separating properties over long periods of time; in other words a battery provided with a separator according to the invention will be capable of providing a large number of useful operating cycles without its capacity being substantially reduced.

It is a more specific object to provide such a separator which will practically be incapable of reacting with the active substances with which it is contacted.

Another object of the invention is to provide a separator which in addition to its function of achieving an efficient separation between the active substances, will participate in retaining said substances in position, thereby providing a battery which will be unresponsive to any sudden accelerations to which it may be subjected in use. It is a consequent object accordingly to provide an electric battery particularly suited for use on board a craft, or missile or other moving body liable to sudden changes in its velocity or path of motion.

A separator according to this invention is of composite character in that it comprises in juxtaposition a semi-permeable element and a permeable or porous element.

Another feature is the permanence of the juxtaposition of said elements, the separator being thus a mechanical unit, to be handled and disposed as such.

Still another feature of my improved separator is that it may comprise a semi-permeable element sandwiched in between two permeable elements.

In accordance with a further feature the elements of the composite separator are permanently bonded together by having their marginal edges interconnected.

Further in accordance with the invention, I may take advantage of the bonding means just mentioned in order to impart particularly desirable characteristics to the said marginal edges of the separator assembly. In this connection it is contemplated to use as the means for bonding or connecting the edges of the separator elements a marginal impregnation of the separator with an agent selected not only with regard to its bonding ability but also with regard to its capacity in introducing certain desirable modifications in the properties of the elements impregnated by it, particularly as regards permeability and capillary conductivity of said elements.

Figure 1:
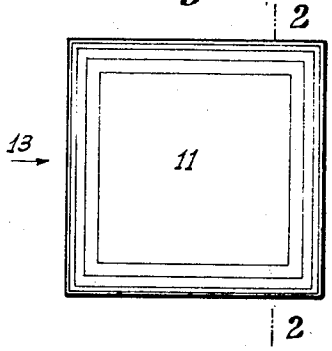
Figure 3:
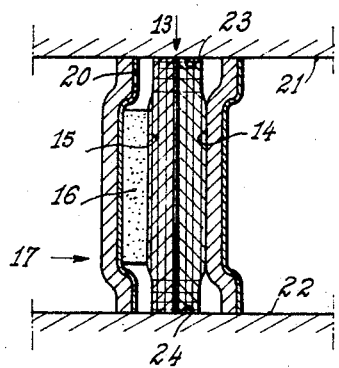
Figure 5:
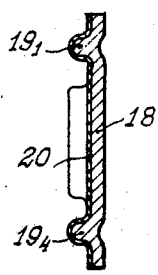
Figure 4:
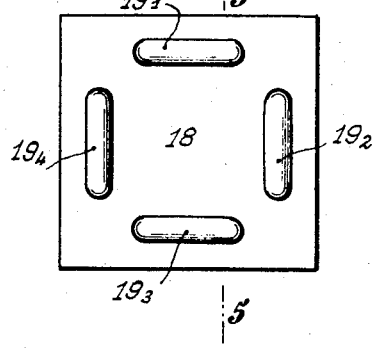

A clear understanding of the invention will be had from a perusal of the ensuing disclosure made with reference to the accompanying drawings which illustrate one embodiment of my improved separator given by way of illustration but not of limitation. In the drawings:

Fig. 1 is a front view of a separator element;
Fig. 2 is a section on line 2—2 of Fig. 1;
Fig. 3 is a section through part of a battery comprising a separator according to the invention;
Fig. 4 is a front view of an electrode in accordance with a modification of the invention; and
Fig. 5 is a section on line 5—5 of Fig. 4.

In the preferred embodiment of a separator according to the invention, the separator comprises three elements 10, 11 and 12, similar in shape, one of the elements, specifically element 10 in the drawing, being made of a semi-permeable material, for example the regenerated cellulose or hydrocellulose known as cellophane, and being interposed between the other two elements 11 and 12 which are made of permeable material, such as blotting paper sheet. The permeable or porous material, should moreover be so selected that the average dimension of the interstices or pores therein will have optimum size in regard to the operation of the battery. The three elements 10, 11 and 12 are thus juxtaposed in the manner of a sandwich, the outer two layers of the separator 13 thus produced being made of permeable material such as blotting paper. In a battery including such a separator as a part thereof, the active materials nowhere are in direct contact with the semi-permeable material, such as cellophane, so that the latter will retain its semi-permeable characteristics for long periods of time. Such a separator will practically not be attacked by the active substances.

A permanent assembly of the elements constituting the separator is obtained by bonding the edges of said elements preferably in the manner about to be explained. The assembly of three elements described above, juxtaposed together, is permeated along each of its edges with a suitable impregnating agent. This agent is selected on the one hand with regard to its bonding capacity for bonding the three elements together and, preferably also, with regard to its capacity for opposing circulation of the electrolyte. In the case of a separator constructed as described above, the invention provides for the use of paraffin as the impregnating agent. Excellent results have been obtained with the so-called histological grade of paraffin.

The invention provides a preferred form of embodiment in which the impregnation is obtained by simply dipping the edges of the separator into a bath of paraffin or the like. In this way the desired degree of impregnation may easily be obtained by adjusting the dipping time and the depth of the edge dipped. It has been found that the content of impregnating agent decreases from the tip of the edge towards the central part of the separator. An accurate adjustment of the degree of impregnation is achieved by using a bath of paraffin or the like at a temperature which is only a little higher than the melting point of the impregnating agent.

Fig. 3 illustrates diagrammatically, by way of example, part of a storage battery comprising such a separator. The said separator 13 is in contact by its face 14 with an active substance of predetermined polarity, for example zinc, and by its other face 15 with an active substance of different polarity, for example silver. In the embodiment shown, the positive electrode 16 is made of sintered silver and the negative electrode 17 is a zinc plate. Desirably the zinc plate is so shaped as to exert a positive blocking or centering action on the cake comprising electrode 16. For this purpose, the electrode 17 may be in the shape of a cup for example. The face of the negative electrode directed towards the positive electrode is coated, e.g. roller-coated, with a layer 20 of the substance forming the positive electrode, silver in the present instance.

In a modification (Figs. 4 and 5), the negative electrode consists of a substantially flat plate 18 formed with ribs $19_1$–$19_4$ for retaining the positive electrode.

Since the electroylte used, an aqueous solution of potassium hydroxide, or a concentrated aqueous solution of zinc chloride, exerts a swelling effect on the materials comprising the separator, the latter has a greater thickness in its non-impregnated part than in its part containing an impregnating agent. A slightly rearwardly displaced position of the marginal zones of the separator favors efficient contact between the active substances and the non-impregnated parts of the separator, as is clearly shown in Fig. 3.

The separator and the electrodes are contained in a suitable casing two opposite walls of which are illustrated at 21 and 22. The invention contemplates so dimensioning the separator 14 that it will contact the said walls with both of its edges 23 and 24. The presence of impregnating agent in the marginal portions of the separator prevents the electrolyte from reaching the walls 21 and 22 through the separator and from thereby producing any tendency toward initiating a short circuit.

The entire electrode assembly, consisting of a plurality of electrode pairs 16, 17 with interposed composite separators 13, is held under substantial transverse pressure due, for example, to the tendency of the semi-permeable and/or the porous separator material to swell in the electrode, such swelling being at least partially prevented by the rigidity of the casing walls.

What I claim is:

1. In an electrochemical battery, in combination, a casing, a plurality of electrode pairs in said casing, each of said pairs comprising a first electrode of one polarity and a smaller second electrode of the opposite polarity in conductive contact with said first electrode, said first electrode making contact along its periphery with said casing and being provided with an integral formation maintaining said second electrode out of contact with said casing, and separator means inserted between adjacent electrode pairs in contact with said first electrode of one pair and with said second electrode of another pair, said separator means including a plurality of juxtaposed electrolyte-permeable layers, including at least one semi-permeable layer, bonded together and to said casing along a peripheral zone out of contact with said second electrode, said peripheral zone forming with the first electrodes of adjacent electrode pairs a plurality of chambers adapted to receive a liquid electrolyte.

2. The combination according to claim 1, wherein said first electrode is dish-shaped.

3. The combination according to claim 1, wherein said formation comprises a plurality of eccentric projections on said first electrode.

4. The combination according to claim 1, wherein said second electrode contains silver as an active material.

References Cited in the file of this patent

UNITED STATES PATENTS

| | | |
|---|---|---|
| 1,480,764 | Koch | Jan. 15, 1924 |
| 1,920,151 | Ruben | July 25, 1933 |
| 2,505,835 | Richardson et al. | May 2, 1950 |
| 2,511,887 | Vinal | June 20, 1950 |
| 2,655,552 | Fuller | Oct. 13, 1953 |

FOREIGN PATENTS

| | | |
|---|---|---|
| 701,643 | Great Britain | Dec. 30, 1953 |